United States Patent Office 2,698,293
Patented Dec. 28, 1954

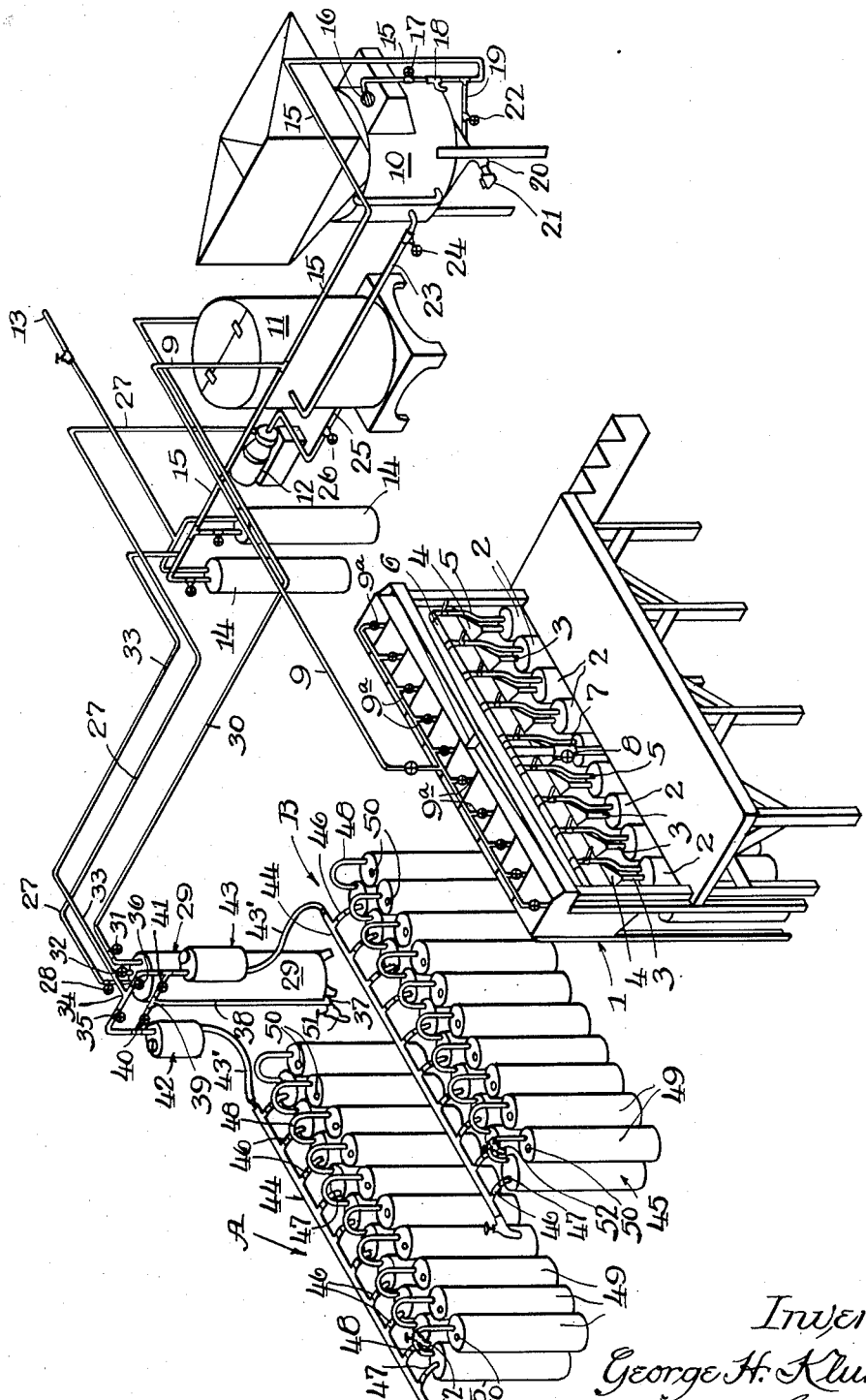

2,698,293

REGENERATION SYSTEM AND METHOD OF REGENERATING AND TREATING ION EXCHANGE MATERIALS

George H. Klumb, Northbrook, Ill., assignor to Culligan, Inc., Northbrook, Ill., a corporation of Delaware Application October 4, 1950, Serial No. 188,461

4 Claims. (Cl. 210—24)

The present invention relates to a novel system, means and manner of regenerating, revivifying, rejuvenating, conditioning or treating ion exchange and filter materials in a multiplicity of units or in a multiplicity of components comprising a single unit, whereby a substantial saving is obtained in the quantity of conditioning or regenerating substances required in such treatment over that required in prior treating systems and methods.

To more completely appreciate the important advance the present invention comprehends in the treatment of such minerals or ion exchange materials, it should be appreciated that such materials consist of particles or granules which are insoluble in the water or liquid in which they are to be employed, possessing active portions or centers capable of reacting or exchanging with dissolved ionized matter in the liquid to be treated with the number of active centers per unit of weight or volume determining the capacity of the ion exchange materials.

During water softening or ion exchange operations, the ion exchange centers are inactivated by ion exchange and this exchange continues to a point of exhaustion that is normally defined as that point where the quality of the effluent is no longer suitable for the purpose intended. When such ion exchange material becomes exhausted it is necessary to bring it back to its former active condition and characteristics by a method or process known as or termed regeneration, in which such exchange material is treated with a predetermined amount of regenerant. The entire process of exhaustion and regeneration is termed a cycle.

Ion exchange material of the type herein referred to may be classified as cation exchange materials and anion exchange materials, and may be further classified as to those occurring in nature or those produced synthetically. Of those occurring in nature, the greensands and bentonites are familiar examples.

The development of synthetic exchangers or exchange materials of the siliceous type was directed toward higher capacity while the development of the synthetic carbonaceous materials was directed toward greater chemical resistance and stability. Resinous exchange materials of the type developed in recent years, combine both the attributes of capacity and chemical and physical stability in a single exchanger.

Cation exchange materials are most commonly applied in the sodium cycle and in the hydrogen cycle. In the sodium cycle, sodium in the exchanger or exchange material is exchanged for other cations in the liquid treated. Generally, a solution of an economical sodium salt such as sodium chloride, is used as the regenerant. When an exchange material is employed in the sodium cycle to remove ionized calcium and magnesium from water the process is called water softening.

In the hydrogen cycle, hydrogen in the exchange material is exchanged for other cations in the liquid treated. In this case a solution of either sulfuric or hydrochloric acid may be used as the regenerant. Cation exchange materials may be used in the hydrogen cycle to reduce the alkalinity of water.

Anion exchange materials are usually employed as acid adsorbents and the most commonly used regenerants in this cycle are solutions of sodium carbonate and sodium hydroxide. When cation exchange material operating in the hydrogen cycle is employed in combination with an anion exchange material in water treatment, the process is called demineralization or deionization.

To assure continued successful and efficient operation of the ion exchange materials as applied in any of the above or other cycles not specifically mentioned, but to which the present invention is applicable, proper and effective regeneration is required.

Although the present invention is disclosed as primarily relating to the art of regeneration of ion exchange materials, it is to be understood that the invention is not limited to regeneration or to ion exchange materials for the reason that the present system, means and manner is well adapted to the application of other conditioning or treating materials such as sterilizing and cleansing agents which are or may be applied to ion exchange or filter beds. As water softening with siliceous or resinous ion exchange materials constitutes the most common and widely used application of ion exchange materials, the following description and disclosure is directed more particularly and in detail to the operation and regeneration of these materials in the sodium cycle and the manner in which they are employed in the art of water softening and conditioning.

In prior systems where it is necessary or appropriate to regenerate a number of water softeners at one time it has been the usual practice to regenerate the softener units in multiple or in a series arrangement. The usual multiple regeneration system merely constitutes a collection of single unit regenerations performed simultaneously from a single distribution system. Inherent in this system are the difficulties of insufficient contact time and the extremely inefficient use of the regenerant resulting in high wastage of such regenerant in the effluent from the individual units.

When regenerating synthetic siliceous zeolite, although only 0.17 pounds of sodium chloride will furnish sufficient sodium for 1000 grains of hardness removal, expressed as calcium carbonate, it is common to use 0.5 pounds of sodium chloride per 1000 grains of hardness removed and thus to obtain a regenerational capacity of about 15,000 grains per cubic foot requires approximately 8 pounds of salt per cubic foot.

When regenerating the sulfonated polystyrene resin ion exchangers at a salt dosage of 15 pounds per cubic foot, a capacity of 30,000 grains per cubic foot is obtained. The regenerational level in this case is 0.5 pounds of salt per 1000 grains of hardness removed.

For economy in domestic application it is necessary either to reduce softener size as much as possible or to substantially increase the capacity in the same size softener. Thus, in these applications it is important to regenerate at levels which approach the maximum capacity of the resin. In order to do this in the older system the dosage of sodium chloride for regeneration must be increased in a disproportionate manner with respect to capacity. For example, a salt dosage of 24 pounds per cubic foot of resin produces a capacity of 33,700 grains per cu. ft. The regenerational level in this case is 0.71 pounds of salt per 1000 grains of hardness removed. Thus, it can be seen that an increase in salt of 60% results in only a 12½% increase in capacity.

In a later development a regeneration system known as the series system was introduced to eliminate some of the salt wastage. This series system is disclosed in the Emmett J. Culligan Patent No. 2,252,065 assigned to the Culligan Zeolite Company. In the operation of the system of this Culligan patent it is customary to regenerate a group of ten units, each containing approximately 1.7 cu. ft. of siliceous zeolite and connected in series. The average capacity obtained by this system is 30,900 grains per tank or 18,200 grains per cu. ft., expressed as calcium carbonate, using 10 pounds of salt per tank or 5.9 pounds per cu. ft. The regeneration level in this case is 0.33 pounds of salt per 1000 grains of hardness removed. A higher average capacity is achieved at a lower regeneration level when compared to a single unit regeneration.

It is apparent in the series system that the exchanger in the first units in the series is contacted by larger amounts of more concentrated salt brine over a longer period of time than that in the last units and also that the salt brine contacting the exchanger in the first units is less contaminated with reaction products. The first units are thus regenerated to a somewhat higher capacity. When regenerating siliceous zeolite, for example, the first unit in the series will have a capacity of 19,400 to 19,700 grains per cu. ft., while the last unit will have a capacity of from 16,700 to 17,000 grains per cubic foot. It should be further recognized that in the series system, regeneration does not begin simultaneously in each unit because of the time lag experienced across the series.

In the application of the system of the Culligan patent to the new type polystyrene resin exchangers, it was thought that the regeneration method used with zeolite could be directly applied. It should be explained that due to the higher capacity of the resin as compared to siliceous zeolite, one cubic foot of resin will have a capacity approximately equivalent to 1.7 cu. ft. of zeolite. Therefore, one cu. ft. of resin per tank unit was used for comparative tests.

It was found that when regenerating a group of 10 units each containing one cu. ft. of polystyrene resin and connected in series, the average capacity was 30,100 grains per cu. ft., expressed as calcium carbonate, at a salt dosage of 10 pounds per tank or per cu. ft. which constitutes a regeneration level of 0.332 pound of salt per 1000 grains of hardness removed. It can be thus seen that average zeolite and resin tank capacities are approximately equivalent at the same regeneration level.

From the average capacities it would appear that the series system should be entirely suited to polystyrene resin regeneration. However, an analysis of the individual tank capacities shown in the following Table I, from which the average was derived, showed a very marked and undesirable variation in capacity from the first to the last unit in the series. In fact, the capacities in the last several units were so low and the overall variation (12,400 grains) was so great that the method would not be suitable in commercial practice.

TABLE I

| Series Position | Capacity in grains per cu. ft. as CaCO₃ |
|---|---|
| 1 | 37,600 |
| 2 | 36,600 |
| 3 | 34,600 |
| 4 | 29,300 |
| 5 | 29,100 |
| 6 | 29,200 |
| 7 | 27,600 |
| 8 | 27,300 |
| 9 | 24,400 |
| 10 | 25,200 |

In using a group of 10 units containing polystyrene resin connected in series and regenerated with 20 pounds of salt per cubic foot the average capacity of the series was elevated to 34,000 grains, expressed as calcium carbonate. While the average capacity was increased by employing the larger dosage of salt, it is apparent that a greater amount of salt was wasted. The regeneration level was 0.59 pounds of salt per 1000 grains of hardness removed as compared to the former level of 0.33 pounds.

The individual capacities of the 10 units in this test containing polystyrene resin, as shown in the following Table II, indicate that the higher dosage of salt reduced the variation in capacity from the first to the last units in the series to only 4,100 grains per cubic foot.

TABLE II

| Series Position | Capacity in grains per of CaCO₃, per cubic foot |
|---|---|
| 1 | 35,200 |
| 2 | 34,600 |
| 3 | 36,100 |
| 4 | 34,600 |
| 5 | 32,100 |
| 6 | 34,200 |
| 7 | 33,100 |
| 8 | 34,100 |
| 9 | 34,200 |
| 10 | 31,100 |

The present invention relates to a novel means for and method or manner of regenerating a plurality of water softening units which results in an increased efficiency and economy far surpassing any attained in prior systems, and which produces excellent and uniform capacity in each of the units of a multiple system and, in addition, provides great savings in the amount of regenerant employed.

The present invention further comprehends a novel and highly effective and efficient method and system of multiple regeneration which is herein defined and referred to as a progressive cascade system. In its simplest form and for illustrative purposes, two softeners are connected in a cascade arrangement in which the regenerant solution enters the inlet of one softener, passes through its exchanger or mineral bed, thence through its outlet to the inlet of the second softener, through the mineral or exchanger bed therein contained and then through the outlet of the second softener to waste. Rinse water follows the regenerant solution through the two softeners. After rinsing, the first softener in the cascade is removed and the softener occupying the last or tail position in the cascade is advanced to the first or head position and an exhausted unit is placed in the last or tail position. Treatment with regenerant solution is then repeated followed by rinsing.

The softener now occupying the head position of the cascade already partially regenerated in the tail position is now highly and efficiently regenerated. The progression of softener units continues with the exhausted softeners being placed in the tail position, the tail tanks advancing to the head of the cascade and the head tanks being removed after each regeneration and/or treatment.

I have found that this progressive cascade system provides equivalent or greater water softening or ion exchange capacity together with uniformity of capacity and a saving of approximately 50% of the regenerant previously found necessary for regeneration.

In the older methods, only a part of the salt employed for regeneration is actually consumed in the regeneration in which the following reactions occur:

*Reactions*

Ca Exchanger + 2NaCl → CaCl₂ + Na₂ Exchanger
Mg Exchanger + 2NaCl → MgCl₂ + Na₂ Exchanger The remaining unused or excess salt passes to waste with the calcium and magnesium chloride brine mixture which has been formed. A preponderance of sodium chloride is used because it will act more rapidly and give higher capacities in the common inefficient regeneration systems than lesser amounts.

In the operation of the present novel progressive cascade system, the partially regenerated head tanks in the cascade arrangement are contacted with a preponderance of concentrated and uncontaminated regenerant thereby having the most ideal conditions for efficient regeneration of the head tanks while the successive tank or tanks in the cascade are contacted by the partially spent regenerant thereby consuming the greater portion of the remaining regenerant which would normally be wasted.

This system is then a truly countercurrent method for regeneration and treatment of ion exchange or filter materials since the most active brine, concentrated regenerant or treating solution first contacts the most completely regenerated or treated ion exchange material or filter material while the least active and most spent regenerant or treating solution contacts the most exhausted or contaminated ion exchange or filter material.

Although the most effective regeneration is accomplished when the most concentrated regenerant is applied to an ion exchange bed for the longest contact time at flow rates sufficient to effect adequate distribution of regenerant throughout the bed and removal of equilibrium reaction products, it has been impractical to approach the optimum regeneration conditions described above for the following reasons:

First in order to use the most concentrated regenerant solution at a minimum flow rate, the only way to increase contact time is to increase the amount of regenerant above any practical level to effect a proportionate increase in contact time. If the amount of regenerant is to be held at a practical level then either the flow must fall below the minimum proper distribution level, the time must be inordinately decreased, or the regenerant must be diluted. It is common practice commercially both to dilute the regenerant and to use excessive quantities of regenerant to secure proper flow conditions and convenient contact time for practical purposes.

It is an important feature of the present novel progressive cascade method and system of obtaining increased contact time without increasing the apparent regeneration time which permits the efficient use of concentrated regenerants and/or higher flow rates. In the case of the simple two unit cascade arrangement the contact time is twice the apparent regeneration time at any given flow rate. Though the two unit cascade embodiment has been used as an example to illustrate the system, the full scale application of the progressive cascade system is best employed for multiple regenerations by providing and connecting a number of cascades to a single distribution system. Depending on desired conditions, the number of units in each cascade may be varied and increased.

When a number of ion exchange units are regenerated in parallel from a single distribution header, small inequalities of flow of regenerant to each unit causes marked variation in unit ion exchange capacities. However, in the regeneration of a number of cascade units operating from a common distribution header in accordance with the present invention, the variation in the unit ion exchange capacities is greatly reduced.

It should be pointed out that in the regeneration of a number of cascade units from a distribution system, the ion exchange tanks may be advanced and/or interchanged between the various cascade units without affecting efficiency or equality of unit ion exchange capacities.

The following tables demonstrate the effectiveness and efficiency of the progressive cascade system in comparison to the older regeneration systems described. Table III compares the ion exchange capacities, regeneration levels and efficiencies of siliceous zeolite water softening units.

TABLE III

|  | Regeneration System | | |
| --- | --- | --- | --- |
|  | Single Unit | Series | Progressive Cascade |
| (A) Regenerant, lb. NaCl/cu. ft. | 8.0 | 5.9 | 3.0 |
| (B) Capacity (as CaCO₃), grs./cu. ft., average | 16,000 | 18,200 | 16,900 |
| (C) Regenerational Level, lb. NaCl/1,000 grs. of hardness removed | 0.50 | 0.33 | 0.175 |
| (D) Efficiency, grs. capacity per lb. of salt | 2,000 | 3,080 | 5,630 |

Table IV compares the ion exchange capacities, regeneration levels and efficiencies of polystyrene resin exchanger in water softener tanks or units.

TABLE IV

|  | Single Unit | Series | Progressive Cascade |
| --- | --- | --- | --- |
| (A) Regenerant, lb. NaCl/cu. ft. | 24 | 20 | 10 |
| (B) Capacity (as CaCO₃), grs./cu. ft., Average | 33,700 | 34,000 | 33,400 |
| (C) Regenerational Level, lb. NaCl/1,000 grs. of hardness removed | 0.71 | 0.59 | 0.30 |
| (D) Efficiency, grs. capacity per lb. of salt | 1,400 | 1,700 | 3,340 |

It is a further feature of my invention that in localities where disposal of regenerant is a problem that the problem of waste disposal will be minimized by approximately one-half or more through economy of regenerant usage.

Although the invention is more specifically described with respect to water softening units employing a mineral exchanger bed of zeolite or polystyrene resins, it is to be understood that the present novel system for and method or means of regeneration and treatment are of broader utility and in its broadest aspect is adapted for use with any ion exchange or filter material whether natural or synthetic, anion or cation.

Further objects are to provide a system and method or manner of maximum simplicity, efficiency, economy and ease of operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawing, the figure therein shown is a perspective view disclosing somewhat diagrammatically a typical arrangement and illustrative embodiment of the present novel progressive cascade system of regeneration and servicing plant for treating portable water conditioning units, including means for backwashing the minerals or ion exchange materials in the tanks or units and for producing a regenerant or salt brine for regeneration.

Referring more particularly to the disclosure in the drawing and to the illustrative embodiment therein shown, there is disclosed a complete system for the regenerating, revivifying, rejuvenating, conditioning or treating of the ion exchange materials in a multiplicity of units, or as a multiplicity of components of a single unit, whereby a very substantial saving is effected in the conditioning material or regenerant employed.

In this complete system there is disclosed a typical installation or mechanism at 1 for backwashing the water softener units as they are received in an exhausted condition and made ready for the novel regeneration operation of the present invention. It consists of means for connecting a plurality of water softeners or tanks 2 in such manner that the usual inlet of each softener is connected to the lower end 3 of a funnel 4 and with the usual outlet connected by a hose or line connection 5 to a water supply line 6 connected to a source of water supply at 7 through a control valve 8. Soft water is supplied to the funnels through a valve-controlled line 9 and separate inlets 9a.

The purpose of such backwashing is to loosen, cleanse and stratify the exchange bed, and to free the bed of filtered solids in order to properly prepare the bed for regeneration. In this backwashing the flow of water is reversed from the direction of flow in normal softening operation, this reverse flow expanding the exchanger bed into free space in the softener and into the funnels 4 connected to and located above the softeners. After such backwashing has been accomplished the water softeners are ready for regeneration.

The novel regeneration system comprises an assembly for the preparation of the brine or regenerant and including a brine or regenerant manufacturing unit 10, a brine or regenerant storage unit 11 and a pump 12. Raw or untreated water enters through a supply pipe 13 and passes through water softeners 14 and the treated or conditioned water therefrom is discharged through a pipe 15 to a liquid level float control 16 and from there it passes through a bed of rock salt in the brine or regenerant manufacturing unit 10. Also connected to this pipe 15 is the pipe or line 9 connected to the backwashing assembly 1.

The pipe 15 adjacent the float control 16 is preferably provided with a valve 17 and a pet cock or faucet 18 for sampling, and a branch pipe 19 which connects to a sediment chamber 20 at the base of the unit 10. Into this sediment chamber settle and collect any undissolved impurities and these collected impurities may be flushed out from time to time as necessary or desirable by the opening of a waste plug valve 21 connected to the sediment chamber and by opening a control valve 22 in the water inlet line 19 which aids in flushing out these collected impurities.

Brine or regenerant produced in the unit 10 passes through a pipe line 23 having a control valve 24 and into the brine storage tank 11, the level of brine or regenerant in this tank being controlled by the liquid level control 16. From adjacent the bottom of the storage tank 11, brine or regenerant is withdrawn by the pump 12 through a pipe line 25 having a control valve 26, the pump then forcing the brine or regenerant through a pipe line 27 and control valve 28 to a brine or regenerant measuring tank 29. This measuring tank is preferably of a size capable of containing sufficient brine or regenerant for the treatment of a predetermined number of units during a single multiple regeneration operation in accordance with the present invention.

Upon the measuring tank 29 having been filled with the desired quantity of brine or regenerant, any excess flows back or is returned to the storage tank 11 through a return pipe line 30 and control valve 31. Although there is disclosed and illustrated but one typical method of manufacturing and measuring the brine or regenerant, it should be apparent that various other means and methods may be substituted therefor, such as a brine or regenerant meter or by dissolving a predetermined quantity or weighed amount of dry salt in the tank. When the measuring tank 29 is filled with the desired or required quantity or depth of brine or regenerant, the brine or regenerant pump 12 is stopped and the measuring inlet valve 28 and brine overflow valve 31 are closed. Thereupon a valve 32 in a pipe line 33 carrying soft, treated or conditioned water from the pipe 15 connected to the outlet of the water softeners 14 is then opened and soft or treated water flows into the measuring tank 29, and displaces the brine or regenerant therein. Beyond the valve 32 this pipe line 33 connects to an inlet pipe 34 having control valves 35 and 36. The displaced brine or regenerant passes out through an outlet 37 adjacent the bottom of the tank 29 and up a pipe line 38 to a T at 39 connecting through either control valve 40 or 41 to feeding tanks 42 or 43, respectively.

Upon opening the valve 40 with valves 41, 35 and 36 closed, brine or regenerant will flow through feeder tank 42 and the outlet tube or discharge pipe 43' to and through a discharge header 44 of a progressive cascade arrangement or system A. This discharge header is connected to the inlet of each of a plurality of aligned water softeners or tanks 45 by means of a flow controller 46 for controlling the flow of the regenerant and an inlet connector 47. The brine or regenerant flowing into each tank or water softener unit 45 in the head position flows through the contained ion exchange material therein and then through the water softener outlets and interconnectors 48 into the inlet of a plurality of aligned water softener units or tanks 49 in the tail position and disposed adjacent the softeners or tanks 45 in the head position, then through the bed of ion exchange material contained therein, and out through the outlet 50 of the tanks to waste as a spent regenerant.

Upon the brine or regenerant being completely removed or displaced from the brine or regenerant measuring tank 29, valve 40 is closed and valve 35 is opened which permits soft water to flow from the pipe line 33 through the feeder 42 and the system following including the water softeners, whereby to effectively rinse the brine or regenerant from these softeners. The brine measuring tank 29 may then be drained of water by opening a drain valve or nozzle 51 connected to the outlet 37 and by opening the valve 31 in the return line 30, and may then be refilled with brine or regenerant by closing the drain valve 51 and opening the valve 28 in the pipe line 27 connected to the discharge port of the brine pump 12 and starting this pump.

After the brine tank 29 has been refilled with brine or regenerant, the valve 28 in the pipe line 27 is closed and the overflow valve 31 in the pipe line 30 is closed, and the valve 32 in the soft water line 33 is opened to permit water to displace brine or regenerant from the measuring tank 29 through the outlet 37, and up the pipe 38 to the T at 39. With the valve 41 open and the valve 40 closed, brine or regenerant will flow through the feeder 43 to duplicate in system B the progressive cascade arrangement of system A.

Upon the brine or regenerant being completely displaced or exhausted from the brine measuring tank 29, the valve 41 is closed and valve 36 is opened to thereby permit soft water from the pipe line 33 to flow through the feeder 43 and the system or arrangement B following which rinses the brine or regenerant from the softener units 45 and 49 in the system. As the component parts in the system or arrangement B are similar to those in the arrangement A and the operation and function is the same, similar reference characters have been applied thereto and its operation is initiated and controlled in the same manner as above described with respect to the system or arrangement A.

When a multiplicity of water softeners are regenerated or rejuvenated in the present novel progressive cascade system, the operation is as follows:

The exhausted softener units after being backwashed are initially connected to the last or tail position in the cascade as occupied by the units 49. Thus, the exhausted softener units which are first placed in the last or tail position in the cascade, increase the efficiency of the regeneration operation in that they are partially regenerated by the excess salt solution or regenerant from the softeners 45 in the first or head position in the cascade system. In this way, the most completely exhausted units are first contacted by the partially expended regenerant and function in reclaiming or scavenging a usable portion of this regenerant which would otherwise have been wasted. In this connection it should be apparent that the number of cascade positions is not limited to two as more positions may be added to further increase the regenerational efficiency of the system.

After the desired quantity of regenerant or brine solution has passed through the system the softener units 45 and 49 are then rinsed in the same system with water. To enable ready determination of the completion of rinsing in the head units 45 so that they may be removed and made ready for service, the interconnector 48 connecting the end units 45 and 49 in each group A and B is provided with a pet cock 52 to permit sampling of the rinse water flow from the tanks or units 45. In the rinsing operation, it is found that the efficiency of rinsing is substantially increased and the period of rinse is substantially reduced by the employment of the present progressive cascade system and method over that accomplished by the use of the series system in the regeneration of multiple units.

After such rinsing has been accomplished the softener units which occupied the last or tail position 49 in the cascade are moved to the first or head position 45 in the cascade and other exhausted softener units are placed in the last or tail position 49. Treatment with the brine solution or regenerant and rinsing is then repeated. The softener units occupying the head cascade position 45, already partially regenerated in the tail position 49, are now uniformly and highly regenerated in a thorough manner and are ready for use. The flow of regenerant is positively controlled by the flow controllers 46 between the limits of approximately 0.4 and 5.0 gallons per minute per square foot of area for each tank, depending upon the concentration of the regenerant solution employed.

Soluble compounds for sterilizing, cleaning or treating ion exchange or filter materials may be added in the progressive cascade system either separately or simultaneously with regeneration by placing such materials in the feeders 42 and 43 from which they are dissolved. The efficiency of using such compounds is greatly enhanced by the use of the progressive cascade system as the most contaminated units are contacted by the partially expended sterilizing or treating compounds and the least contaminated units are first contacted by the strongest and most active treating compounds.

From the above description and the disclosure in the drawing, it will be readily apparent that the present invention comprehends the provision of a novel progressive cascade system, means and manner of regenerating or reactivating partially or wholly exhausted ion exchange material contained in separate portable units, tanks or containers, the most concentrated and active regenerant entering the inlets of one group of units through a common header passing in controlled quantities to each unit of that group and then through the partially contaminated or exhausted ion exchange material in each unit for more completely regenerating this material, discharging the partially expended regenerant from the group of regenerated units treated thereby and passing this regenerant into a second group of units and through their beds of contaminated or exhausted ion exchange material therein for partially regenerating this material, after which the units of the second group are moved to the position of the first group of units and thereat treated with the most concentrated and active regenerant.

Having thus disclosed the invention, I claim:

1. The progressive cascade method of regenerating and reactivating partially or wholly exhausted ion exchange materials contained in each of a plurality of separate portable water conditioning units each having an inlet for the water to be treated and an outlet for the treated water, comprising the steps of connecting the outlet of each of one set of a plurality of such units placed in head position with the inlet of another unit of a second set disposed in cascade arrangement, simultaneously but separately supplying and controlling a fresh regenerant and reactivating solution from a common supply to the inlet of and through the contents of each unit of the head set, forcing all of the partially spent solution issuing from the outlet of each unit of the head set directly through its connection with and through the inlet and contents of the unit of the second set connected thereto, completely rinsing the solution from the units of the head set preparatory to service operation after each unit thereof has been previously partially regenerated in the cascade arrangement as a unit of a second set, disconnecting and removing the regenerated units of the head set, progressively moving each unit of the partially regenerated second set to replace a unit of the regenerated head set and provide a unit of the next head set, replacing each of said units in the second set progressively moved to provide a unit of the next head set with an exhausted unit requiring regeneration, connecting the outlet of each unit of the then head set to the inlet of an exhausted unit of the then second set requiring regeneration, simultaneously but separately supplying the inlet of each unit of the then head set with a fresh regenerant and reactivating solution and flowing this fresh solution through the contents of each of said units of the head set to complete its regeneration and forcing all of the partially spent solution issuing from the outlet of each unit of the then head set directly through its connection with and through the inlet and contents of the connected unit of the then second set, and rinsing the solution from each unit of the then head set.

2. In a progressive cascade method of increasing the effectiveness of regeneration of ion exchange and filter materials contained in a plurality of tanks by providing selective scavenging of active ingredients of a partially spent regenerant for the economical use of the regenerant and in which the total regenerant usage per tank is substantially reduced at a capacity level as compared to series regeneration without progression, the steps of regenerating multiple sets of tanks in which the materials are exhausted with one set in head position and another in following position with a tank in head position connected to a tank in following position, supplying and controlling the flow of a fresh regenerant from a common supply line simultaneously to each tank located in head position and then directly supplying all of the partially spent regenerant issuing from each tank in said head position to one of the tanks located in following position with each tank of the set in following position in cascade arrangement with the outlet of each tank of the head set connected to the inlet of a tank of the following set, the material within each tank of the following set receiving and selectively using active portions of all the partially spent regenerant from a tank of the head set to become partially regenerated, disconnecting each tank of the head set from its connected tank in the following set, removing the tanks of the head set and positioning each tank of the following set in a position to replace a tank of the previous head set, placing in cascade position another following set of tanks in which the contained materials are exhausted and in need of regeneration, connecting the outlet of each tank of the new head set to the inlet of one of the tanks of the then following set, and treating each of the tanks of the new head set partially regenerated in its previous following position with a fresh regenerant from the common supply line to complete the regeneration of each tank of the then head set.

3. In a progressive cascade method of increasing the effectiveness of regeneration of ion exchange and filter materials contained in a plurality of portable tanks by providing selective scavenging of active ingredients of a partially spent regenerant for the economical use of the regenerant to approach optimum efficiency at a capacity level of the total quantity of regenerant employed, the steps of regenerating the exhausted materials in multiple sets of tanks with each tank of each set having an inlet for the water to be treated and an outlet for the treated water, positioning each set of tanks in progressive cascade arrangement in which one set of tanks is arranged in head position and another set of tanks is arranged in following position with the inlet of each tank in head position connected to a common supply line carrying a fresh supply of regenerant and the outlet of each tank in head position connected to the inlet of a tank in following position, supplying and controlling the flow of a fresh regenerant from the supply line to the inlet, through the materials and through the outlet of each tank of the head set, directly flowing all of the partially spent regenerant from each tank of the head set through the inlet, through the materials and through the outlet of a tank in the following set, flowing rinse water through the inlet, through the materials and through the outlet of the connected tanks in the head set, disconnecting and removing the tanks of the head set, progressively moving each tank of the following set to the position of the head set to provide the next head set, replacing each tank of the previous following set with a tank requiring regeneration, connecting the inlet of each tank in the then head set to the common regenerant supply line, connecting the outlet of each tank of the then head set to the inlet of one of a set of unregenerated tanks with the latter set of unregenerated tanks providing a new following set, and repeating the previously mentioned controlled flow of fresh regenerant to each tank of the head set and all of the partially spent regenerant from each tank of the then head set to a tank of the then following set, and rinsing the connected tanks of the head set preparatory to service operation.

4. In a progressive cascade system for the regeneration and treatment of partially and wholly exhausted ion exchange and filter materials contained in a plurality of tanks each having an inlet for the water to be treated and an outlet for the treated water, a header having multiple connections and means for supplying and flowing a fresh supply of regenerant and treating solution to the header including multiple connections on the header for supplying the fresh regenerant simultaneously through the inlet and the materials in each of a head set of tanks, a flow controller in each of said connections for controlling the flow of regenerant therethrough, means for directly supplying all of the partially spent regenerant issuing from the outlet of each tank of the head set to the inlet of and the contained materials in a tank of a following set requiring regeneration and treatment, including connections for detachably connecting the outlet of each tank of the head set with the inlet of a tank of the following set to permit disconnection and progressive movement of each tank of the following set to the position of a tank of the head set of tanks after those of the head set are completely regenerated, and successively replacing the following set with another set of tanks requiring regeneration whereby each of said tanks in sequence is initially treated in following position by all of a partially spent regenerant received directly from one tank in the head set and subsequently treated when in head position by a fresh regenerant entering its inlet and flowing through its contained materials and discharged through its outlet, and means for successively rinsing the regenerant and treating solution from the tanks regenerated and ready for service operation.

References Cited in the file of this patent

UNITED STATES PATENTS

| Number | Name | Date |
|---|---|---|
| 1,510,469 | Duggan | Oct. 7, 1924 |
| 1,685,818 | Kenney | Oct. 2, 1928 |
| 1,792,220 | Green | Feb. 10, 1931 |
| 1,818,638 | McGill | Aug. 11, 1931 |
| 1,903,958 | Clark | Apr. 18, 1933 |
| 1,947,248 | Burks | Feb. 13, 1934 |
| 2,252,065 | Culligan | Aug. 12, 1941 |
| 2,323,830 | McMillan | July 6, 1943 |
| 2,366,651 | Rawlings | Jan. 2, 1945 |
| 2,458,115 | Swenson | Jan. 4, 1949 |